Aug. 11, 1931.  M. W. MOESTA  1,818,734

VEHICLE BODY CONSTRUCTION

Filed May 9, 1928  2 Sheets-Sheet 1

INVENTOR
MARVIN W. MOESTA.
BY
ATTORNEY

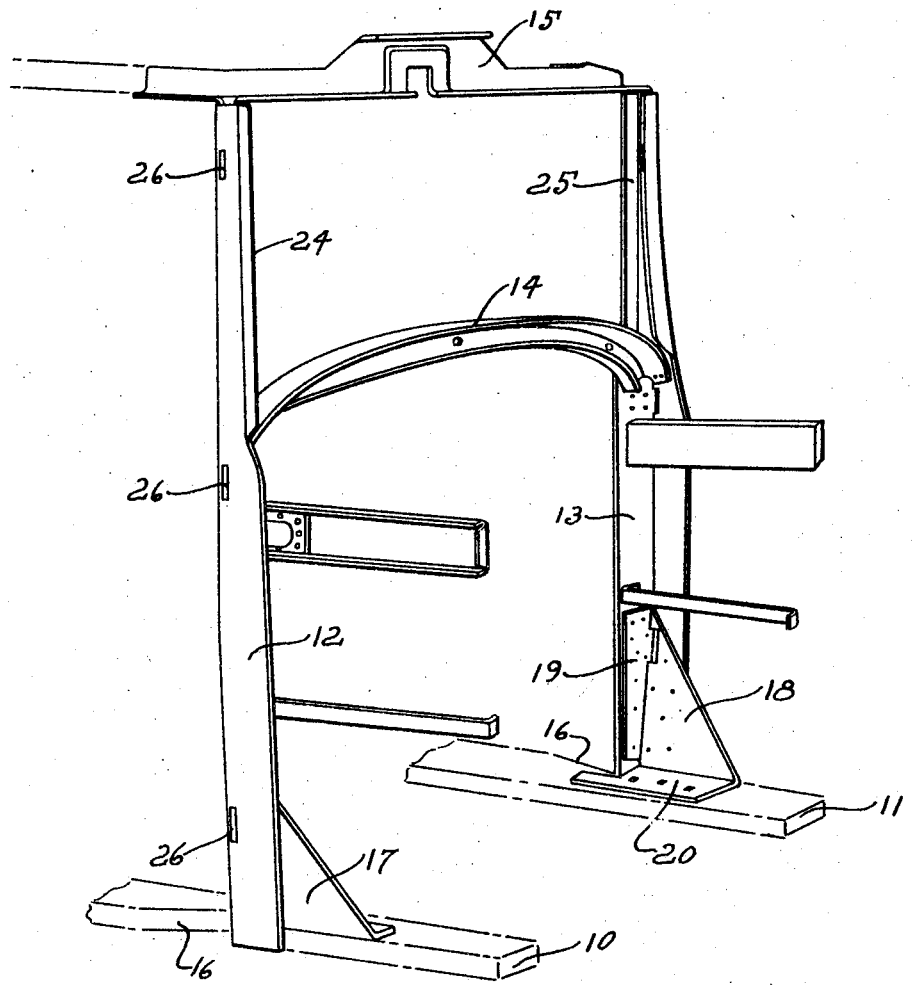

Patented Aug. 11, 1931

1,818,734

UNITED STATES PATENT OFFICE

MARVIN W. MOESTA, OF DETROIT, MICHIGAN, ASSIGNOR TO THE MURRAY CORPORATION OF AMERICA, A CORPORATION OF DELAWARE

VEHICLE BODY CONSTRUCTION

Application filed May 9, 1928. Serial No. 276,263.

One of the objects of my invention is to provide a strong and rigid front metal frame member for a vehicle body which is particularly adapted for use in connection with other frame members of wood and to which metal paneling may be efficiently and cheaply applied.

Another object of my invention is to provide in combination with a front frame member for a vehicle body, metal panels which may be applied thereto and efficiently joined thereon.

With these and other objects in view, my invention consists in the arrangement, combination and construction of the various parts of my improved device, as described in the specification, claimed in my claims and shown in the accompanying drawings, in which Fig. 1 is a perspective of a front metal frame member for a vehicle body and panel therefor embodying my invention and in which certain parts are broken away to better illustrate the construction and application thereof.

Fig. 6 is a perspective of a metal frame member embodying my invention without paneling, and mounted upon wood body sills.

Figure 1:
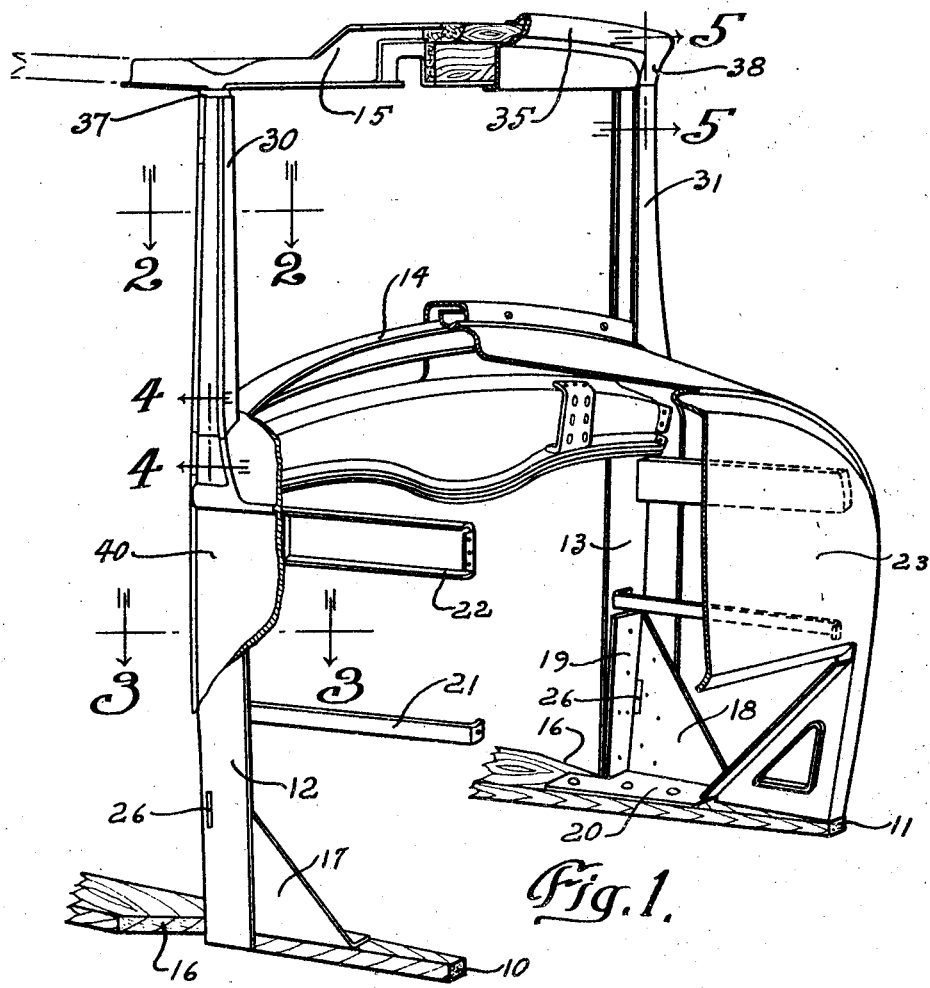
Figure 2:
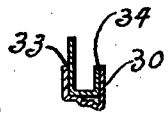
Fig. 2 is a view taken on the line 2—2 of Fig. 1.
Figure 3:
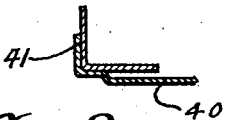
Fig. 3 is a view taken on the line 3—3 of Fig. 1.
Figure 4:
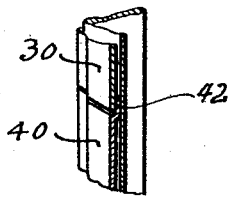
Fig. 4 is a view taken on the line 4—4 of Fig. 1.
Figure 5:
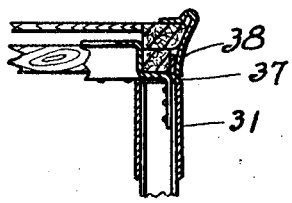
Fig. 5 is a view taken on the line 5—5 of Fig. 1.

The numerals 10 and 11 designate the forward portions of right and left wood body sills. 12 and 13 are the right and left forward body pillars and are constructed of metal, being of angle cross section in their lower portions, and of channel cross section in their upper portions. A metal cowl bar 14 extends between and joins the pillars 12 and 13 at their intermediate portions and is preferably secured to the respective forwardly extending and inwardly extending flanges of said lower portions of the pillars and/or to said intermediate portions thereof, either by welding or rivets the flanges here referred to being shown as broader than the corresponding elements of said channel-section upper portion. A metal header member 15 joins the upper ends of the pillars 12 and 13 and is preferably secured thereto either by rivets or by welding. This header member 15 is subject of application for Letters Patent filed by Erwin L. Bare, Serial No. 276,272 filed May 9, 1928. The wood sills 10 and 11 are notched as at 16, forming shoulders on the outer edges thereof against which the transverse flanges of the pillars 12 and 13 rest. The forwardly extending flanges of the pillars 12 and 13 rest against the outer edges of the sills 10 and 11 adjacent the notches 16 as shown. Triangular brace members 17 and 18 having lateral flanges 19 and 20 formed on their vertical and horizontal edges as shown, are secured to the pillars 12 and 13 by welding or riveting the web portions of the braces 18, and the vertical flanges 19 to the inside of the forwardly extending and transverse flanges respectively of the pillars. The lateral flanges 20 are suitably secured to the sills 10 and 11 by screws and bolts as shown. The pillars 12 and 13 being of angular cross section below the cowl bar 14, provide ample surface for attaching the braces 21 and 22 which extend forwardly and are secured to the dash panel 23, and for attachment of the braces 17 and 18. The channel shaped portions of the pillars 12 and 13 above the cowl bar 14 are, because of their inwardly facing channels, well adapted to receive a windshield frame. In order to lessen the obstruction to vision and to simplify the application of a windshield frame and provide for an outwardly opening windshield, I have made the front channel sides 24 narrower than the rear channel sides 25. Slots 26 may be provided at intervals in the pillars, as shown in Fig. 6 so that door hinge plates may be inserted therethrough and suitably secured to the rear transverse flanges of the pillars 12 and 13. My pillars are particularly adapted to the application of cover panels of metal and a cowl panel, which may be shaped to any ornamental form desired. The pillar cover panels 30 and 31, shown in Figs. 1 and 2, are applied to the pillars between the cowl bar 14 and the header 15 by spot-welding one edge of the panel to the rear channel side as at 33 and by spot-welding the other edge of the panel to the front channel side as at 34. A single header panel 35 may be used and the upper edges of the pillar cover panels 37 are preferably offset inwardly and underlap the lower corner edges 38 of the header panel. The cowl panel 40 is applied by welding its rear vertical edge as at 41, Fig. 3, to the transverse flanges of the pillars 12 and 13. The upper horizontal edge of the cowl panel may be welded to the surface of the cowl bar 14 and the upper corner edges of the cowl panel 40 are offset inwardly as at 42, Fig. 4, and underlap the lower edges of the pillar panels 30 and 31. This method of joining panels has proved very efficient in that it forms a watertight and neat appearing close joint. My pillars being of angle cross section in their lower portion and channel cross section in their upper portion, are of ample strength and relatively little bulk. The angular cross section below the cowl bar is very well adapted to the application of the cowl panel and the channel cross section above the cowl bar is particularly adapted to simplify the installation of a windshield and also to the application of cover panels of such configuration as may be desired. The angular cross section of my pillars at their lower ends permits them to be readily applied to and secured to wooden body sills which is of advantage in the construction of composite bodies.

Other advantages of my construction are the use of a grade of metal for the front pillar members which need not be highly finished and is therefore less costly than most steel pillars now in use which are not covered by panels and therefore must be of highly finished material in order to conform to the finish and appearance of the rest of the body. My construction is also adapted to the application of cover panels of any configuration desired to conform with the rest of the body. This is of course of great advantage to manufacturers who are producing many different styles of bodies for different lines or different models of the same line in that they need not change their pillar construction for each style or type but may apply suitable panels to conform to the rest of the body, and may therefore use the same pillar construction for all bodies which materially reduces costs of manufacture.

Formal changes may be made in the specific embodiment of the invention described without departing from the spirit or substance of the broad invention, the scope of which is commensurate with the appended claims.

What I claim is:

1. A front upright frame member for a vehicle body composed of three metal stampings, comprising right and left pillar members extending from top to bottom of the body and a cowl bar extending between and connecting the intermediate portions of said pillar members, said pillar members each comprising an angular cross section portion below the cowl bar and a channel cross section portion thereabove, positioned with the open side of the angular portions presented inwardly and forwardly and with the channel portions presented inwardly, and the flanges in at least said intermediate portion, to which said cowl bar is secured, being wider than the corresponding elements of said channel portion.

2. A front upright frame member of a vehicle body composed of four metal stampings comprising right and left pillar members extending from top to bottom of the body, a cowl bar extending between and connecting the intermediate portions of said pillar members, a header member extending between and connecting the tops of said pillar members, said pillar members being of angular cross section below the cowl bar with one side of the angle extending transversely of the body and the other side extending forwardly thereof and being of channel cross section above the cowl bar with the channel sides extending transversely of the body and having the rear channel side of greater width than the front channel side, said cowl bar being of channel cross section and positioned with the channel sides extending forwardly, and said header member being of channel cross section in its intermediate portion and positioned with the channel sides extending forwardly, and of angular cross section in its end portions and positioned with the open side of the angle outwardly and upwardly presented and having rearwardly extending angular portions on its ends with the open side of the angle outwardly and upwardly presented.

3. In automobile body construction, the combination with two longitudinally extending body sills, of a front upright frame member comprising right and left pillar members each formed of a single metal stamping of angular cross section below the cowl line and of channel cross section above the cowl line, and positioned with the open side of the angular portions facing inwardly and forwardly and with the channel portions facing inwardly, a pair of metal angle brackets each nested within and integrally secured to the lower portion of one said pillar members and having a bottom horizontal flange extending forwardly and rearwardly and inwardly of each of said pillar members and based upon and secured to said sill members, and a cowl bar formed of a single metal stamping extending between and secured to the intermediate portions of said pillar members at the juncture of their channel and angular portions.

4. In automobile body construction, and in a front upright frame member: right and left pillar members each formed of a single metal stamping and comprising an angular cross section pistion below a cowl line and a channel cross section a portion above the cowl line and positioned with the open side of the angular portions facing inwardly and forwardly and with the channel portions facing inwardly, at least one of the flanges of said angular cross-section portion, where engaged by the cowl bar, being wider than the corresponding element of the channel cross-section portion thereabove.

5. In automobile body construction, the combination with two longitudinally extending body sills having outwardly presented transverse notches adjacent their forward ends, of a front upright frame member comprising a right pillar member and a left pillar member each formed of a single metal stamping of angular cross section below the cowl line and of channel cross section above the cowl line and positioned with the open side of the angular portions below the cowl line facing inwardly and forwardly and with their lowermost ends engaging the transversely notched portions of said sills, and having their channel portions above the cowl line facing inwardly, a pair of metal angle brackets each nested in and integrally secured to the lower portion of one of said pillar members and having a bottom horizontal flange extending forwardly and rearwardly and inwardly of each of said pillar members and based upon and secured to said sill members, and a cowl bar formed of a single metal stamping extending between and connecting the intermediate portions of said pillar members at the juncture of their channel and angular portions.

6. In automobile body construction, the combination with two longitudinally extending body sills having outwardly presented transverse notches adjacent their forward ends, of a front upright frame member comprising a right pillar member and a left pillar member each formed of a single metal stamping of angular cross section below the cowl line and of channel cross section above the cowl line and positioned with the open side of the angular portions below the cowl line facing inwardly and forwardly and with their lower-most ends engaging the transversely notched portions of said sills and having their channel portions above the cowl line facing inwardly, a pair of metal angle brackets each nested in and integrally secured to the lower portion of one of said pillar members and having a bottom horizontal flange extending forwardly and rearwardly and inwadrly of each of said pillar members and based upon and secured to said sill members, and a cowl bar formed of a single metal stamping extending between and connecting the intermediate portions of said pillar members at the juncture of their channel and angular portions, and a header member formed of a single metal stamping extending between and secured to the tops of said pillar members.

MARVIN W. MOESTA.